United States Patent
Nathman et al.

(10) Patent No.: US 6,268,858 B1
(45) Date of Patent: Jul. 31, 2001

(54) DATABASE CORRELATABLE CHART GENERATION SYSTEM AND METHOD

(75) Inventors: Cheryl Kay Nathman; Reed C. Whittington, both of Arlington, TX (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 07/941,466

(22) Filed: Sep. 8, 1992

(51) Int. Cl.[7] .................................................. G06T 11/00
(52) U.S. Cl. ........................... 345/419; 701/217; 701/208
(58) Field of Search .................................... 395/119, 135, 395/125, 129, 130, 122, 134, 127; 345/113, 419, 422, 425, 427, 429, 430, 434, 435; 364/420, 449; 382/157; 701/208, 211, 217

(56) References Cited

U.S. PATENT DOCUMENTS

| | | | |
|---|---|---|---|
| 3,801,720 | * 4/1974 | Rymer | 434/2 |
| 4,208,810 | * 6/1980 | Rohner et al. | 395/127 |
| 4,661,811 | * 4/1987 | Gray et al. | 345/113 |
| 4,685,068 | * 8/1987 | Greco, II et al. | 382/157 |
| 4,823,287 | * 4/1989 | Thompson | 395/119 |
| 4,876,651 | * 10/1989 | Dawson et al. | 364/449 |
| 4,976,035 | * 12/1990 | Levy et al. | 33/1 A |
| 5,249,264 | * 9/1993 | Matsumoto | 395/134 |
| 5,444,618 | * 8/1995 | Seki et al. | 364/420 |

* cited by examiner

Primary Examiner—Mark Zimmerman
(74) Attorney, Agent, or Firm—Andrew L. Tiajoloff

(57) ABSTRACT

A method and system (10) for generating database correlatable navigational charts that precisely match the simulated terrain and cultural features of a non-real-world visual database (22). The method includes the steps of reading the visual database into a data structure (102), testing for necessary contour intervals (106), converting the planar locations of each of the areal, contour line, linear and point features of the visual database into a pre-selected scale, and plotting each of these visual database features.

16 Claims, 9 Drawing Sheets

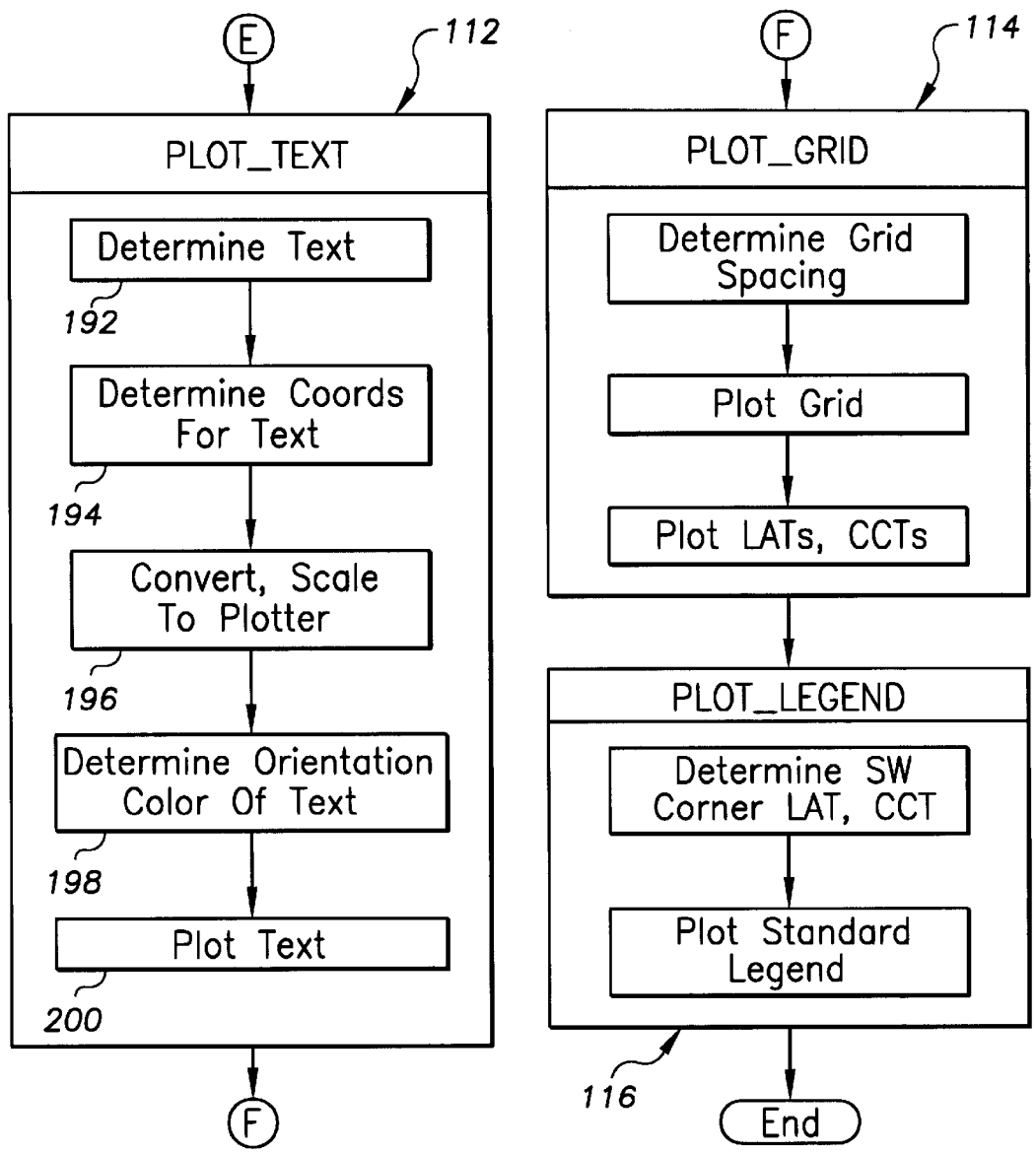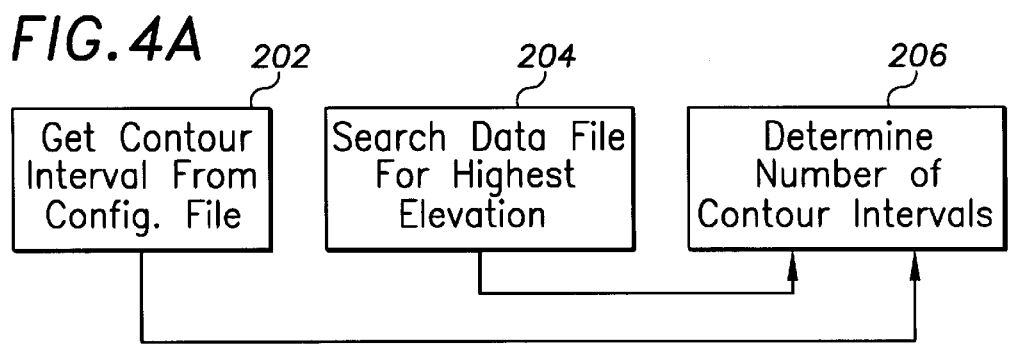

DATABASE CORRELATABLE CHART GENERATION SYSTEM AND METHOD

BACKGROUND OF THE INVENTION

1. Field of the Invention

The present invention relates generally to the generation of navigational charts, and particularly to a method and system for generating a database correlatable navigational chart from a visual database which defines the terrain and cultural features of a simulated environment.

2. Description of Related Art

Flight simulation has proved to be an effective method for crew and mission training. An integral component of flight simulation is the out-of-the-window visual scene. The creation of such a visual database typically begins with real-world source data that has been derived from satellite imagery, U.S. Geological Survey information or a mapping agency. However, in order to comply with visual system requirements, changes to this data is generally made during database production. In this regard, it should be appreciated that the training crew needs to be presented with as many different situations as possible, and these situations may be introduced through a non-real-world or customized visual database which is tailormade for the desired training exercise. Accordingly, it is often necessary to add features to the visual database that do not appear in the real-world area being simulated.

As a result of the process of editing or filtering the visual database, it is no longer an exact representation of the original source data. However, mission planning and navigation with real-world charts in a simulated world can be quite cumbersome. Additionally, in the case of a customized visual database, no real-world charts exist. In order for the crew to plan their best route, and any possible alternatives, an accurate representation of that visual database is necessary. Accordingly, there is a need for a technique for generating database correlatable charts that are an exact depiction of the database.

SUMMARY OF THE INVENTION

The present invention provides a method and system for generating database correlatable navigational charts that precisely match the simulated terrain and cultural features of a non-real-world visual database. The method includes the steps of reading the visual database into a predetermined data structure, extracting elevation information from the data structure for each block of terrain and determining where contour lines should be drawn, converting the planar locations of each of the areal, linear and point features of the visual database into a pre-selected scale, and plotting each of these visual database features.

One of the advantages of the invention is the ability to produce database correlatable charts that reflect changes to the visual database throughout the life of the visual database. For example, database correlatable charts can be generated for mission rehearsals which exactly correlate to the environment being simulated where the current issue of standard maps do not reflect progressive changes in this environment. Additionally, it is no longer necessary to create a new visual database just to capture a new type of training requirement. Accordingly, the effective life-span of a visual database may be considerably extended to support new training scenarios. Furthermore, these charts can be tailormade to user specifications without loss of database correlation. For example, if terrain following at altitude is the goal, then different elevations can be clearly shown by filling each elevation band with a different color. Different terrain types can also be shown by different fill patterns, while still representing elevations through contour lines and spot elevation depictions.

Database verification is another area where database correlatable charts are an advantage. The gaming area for a large area visual database typically covers thousands of square nautical miles. Verification of every part of the visual database is not feasible within a normal trainer system operational test and evaluation schedule. For example, with a 1000 square mile visual database, it would take approximately 40 hours to fly the visual database in the simulator in order to check the database content against real-world charts. Instead of flying or traversing the entire visual database, specific areas may be randomly selected in order to check the correlation of the visual database against the database correlatable charts. Once it is determined that the database correlatable charts are a direct reflection of the visual database, then these charts may be used to verify the remaining content of the visual database. This will save not only verification man-hours, but the use of database correlatable charts will also save valuable trainer down-time and/or visual system test and evaluation time.

Additionally, the present invention will also reduce the amount of time needed to develop the visual database. In this regard, it should be appreciated that it is very time consuming to find problems with a visual database without the aid of database correlatable charts. Accordingly, the database correlatable charts may be used to give an accurate view of the progress of the visual database production. Furthermore, the database correlatable charts will provide a permanent and completely accurate record of the visual database content.

BRIEF DESCRIPTION OF THE DRAWINGS

FIGS. 3A–3G provide a set of flow charts to illustrate the routines shown in FIG. 2.

FIGS. 4A–4C provide a set of flow charts to illustrate various functions identified in FIGS. 3C.

DESCRIPTION OF THE PREFERRED EMBODIMENTS

Figure 1:
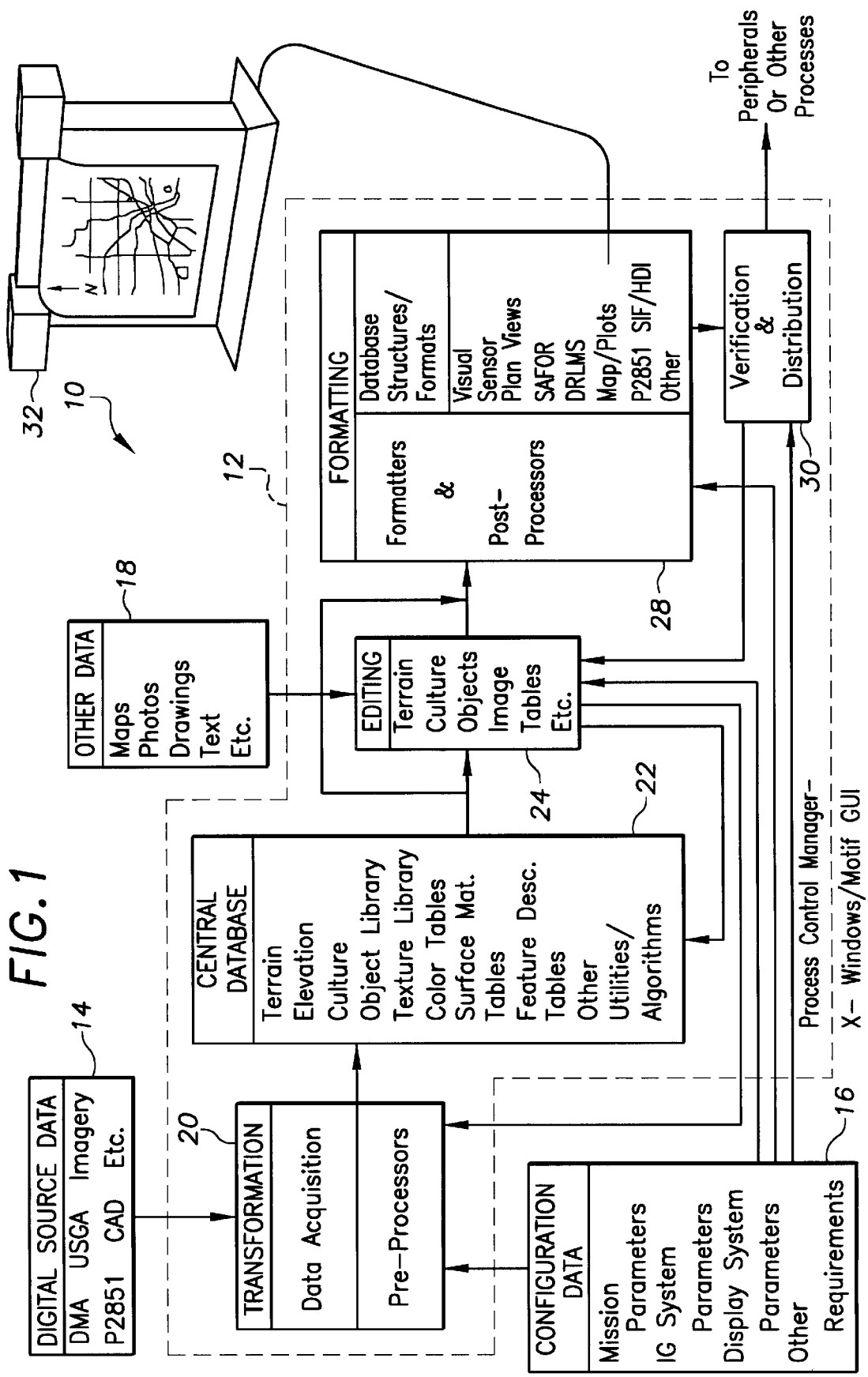
FIG. 1 provides a diagrammatic view of a database correlatable chart generation system in accordance with the present invention.

Referring now to the drawings in more detail, FIG. 1 diagrammatically illustrates the database correlatable chart generation system 10 according to the present invention. FIG. 1 includes a large broken-line block 12 which represents the computer workstation that contains the processing software that may be used to create a three-dimensional visual database of a simulated world. In one embodiment according to the present invention, the computer workstation 12 is a Silicon Graphics workstation which utilizes a UNIX operating system and the X-Windows/MOTIF graphical user interface. However, it should be appreciated that other suitable computer systems may be used in the appropriate application.

FIG. 1 also illustrates three external blocks 14–18, which represent various sources of input data. For example, block 14 represents the basic source data from which a visual database of a geographic area may be generated. This basic source data may be received in a number of different cartographic formats, such as data which has been made available from the Defense Mapping Agency ("DMA"), from U.S. Geological Survey ("USGS") information, from Project 2851 SIF/HDI or GTDB information, or from satellite imagery. In contrast, block 16 represents configuration data which contains a set of requirements of the project in question. For example, this configuration data may identify which cultural features should be shown or hidden. Additionally, the configuration data may identify a specific geographic area to be processed, or whether the imaging system of a flight simulator should be set for low level flying.

As shown by block 20, the source data 14 is transformed into an intermediate database file format which will facilitate a subsequent editing process. Similarly, the configuration data 16 will be pre-processed with the source data 14 in order to create the central database 22. The central database 22 will generally include terrain data, elevation data, cultural data, an object library (e.g., icons for radio towers, bridges and dams), a texture library (e.g., a swamp v. a lake), color tables (e.g., blue for water and purple for roads), surface material tables (e.g., asphalt, wood or soil), feature description tables (e.g., the size and orientation of a warehouse), and other utilities or algorithms appropriate to the visual database (e.g., polygonizing assumptions).

Then, as illustrated by external data block 18 and internal editing block 24, various aspects of the central database 22 may be edited or updated. For example, recent photographs of the subject area may be used to change the cultural data contained in the central database. In any event, it should be understood that the editing process may be used as part of the process of creating a simulated world from real world source data 14. In this regard, arrow 26 also indicates that the configuration data 16 may be utilized at this point to create the simulated world which is desired for a particular training exercise. In one form of the present invention, this editing process is performed graphically by adding or deleting features which are displayed on a computer monitor. As a result of this editing process, one or more "Terrain Culture Editor" (.TCE) files will be produced to represent the simulated world.

After the visual database has been created for the simulated world of interest, then one or more formatting processes will be performed. In this regard, it should be appreciated that each imaging system will have its own native format. In other words, the file needed by the imaging system of a flight simulator will be different than the file needed to create a hard-copy map or chart of the visual database. Accordingly, different post-processing steps will be needed for each imaging system employed. Thus, for example the P2851 identifier in block 28 refers to a standard simulator interchange format. Similarly, the SAFOR identifier refers to a semi-automated forces format, and the DRLMS identifier refers to a digital radar land mass system format. As will become more apparent from the description below, the present invention is directed to generating a plot file and using this plot file to producing a database correlatable chart. It should also be noted that block 30 is used to indicate that appropriate verification steps may be taken before the resulting target databases are distributed.

In one form of the present invention, a Calcomp 5835XP plotter 32 is used to ultimately generate the database correlatable chart. This particular plotter utilizes a sophisticated plotting language which is close to a graphical language. However, it should be appreciated that other suitable plotters or even printers could be used in the appropriate application.

It should be noted at this point that chart scale and the area shown on the chart go hand in hand. A visual database could well cover several hundred miles. If, for example, the visual database spanned an area 6 degrees latitude by 6 degrees longitude, it would be unfeasible to plot an area 2 degrees to a scale of 1:10000. The chart would be almost 73 feet on a side. However, the entire visual database could be plotted to a scale of 1:1000000 and be approximately 26 inches to a side. The larger the area to be shown on the database correlatable charts, the smaller the scale.

Accordingly, the visual database is usually built in area blocks of a specific size. As an example, the visual database could use 16000×16000 meter area blocks, 500 meter elevation post spacing and 200 meter contour intervals. In this regard, one visual database file will contain the data which defines all of the terrain and cultural features in that area block. Thus, it should be appreciated that small scale charts usually require several data files to make up the entire database correlatable chart.

There are generally three types of cultural features contained in the visual database, namely areal features (e.g., towns and lakes), lineal features (e.g., highways and railroad tracks) and point features (e.g., radio towers and buildings). It should be appreciated that the square cells may take any appropriate polygonal or close area shape, the square linears may take any appropriate linear or non-linear course, and the square points may take any appropriate icon shape. It should also be noted that the icon shape may be built from one or more graphic primitives.

Ultimately, the planar locations (e.g., x and y position from 0 meters to 16000 meters) for each cultural feature must be extracted from the visual database and converted to plotter units. For example, in order to accurately depict an areal feature on the database correlatable chart, two pieces of information are needed, namely: its array of x and y locations and the feature type (e.g., a town or a lake). The feature can then be outlined and filled with the color used to indicate that type of areal feature. A lineal feature also needs an array of x and y locations and feature type. However, a lineal feature does not have to be area filled. Rather, the x and y locations are connected end to end with the particular pen style which is used to indicate that feature.

A point feature may require more information to display it on a database correlatable chart. Some point features may be depicted by standard icons, so the feature's x and y location and feature type are sufficient. However, other types of point features may be best represented by a more specific picture, such as a large warehouse. Thus, in the case of a building, the planar locations of the building and its orientation in a known reference frame would be required.

Figure 2:
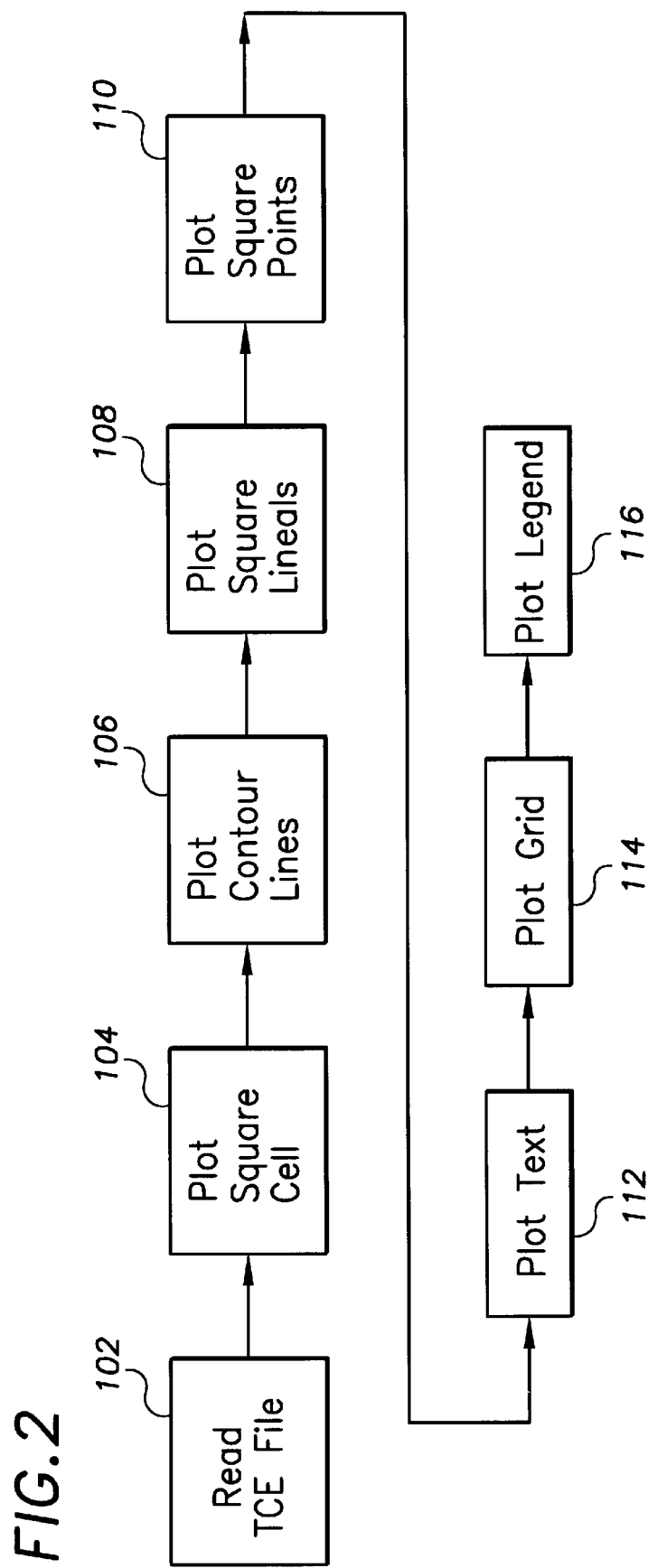
FIG. 2 is an overall flow chart of the method of generating a database correlatable chart in accordance with the present invention.

Referring to FIG. 2, an overall flow chart 100 of the method for generating a database correlatable chart according to the present invention is shown. In this regard, the first step is to read the Terrain Culture Editor (.TCE) file (block 102). A detailed discussion of this routine will be presented in connection with FIG. 3A. Then, as illustrated by blocks 104–116, a series of routines will be executed to plot all of the features on the hard-copy (e.g., paper) of the database correlatable chart. Each of these routines are shown individually in FIGS. 3A–3G. Thus, for example, the Read_TCE_File routine 102 is shown in FIG. 3A, while the Plot_Sqr_Cell routine 104 is shown in FIG. 3B.

Referring generally to FIGS. 3A–3G, a set of flow charts is provided to illustrate the routines identified in FIG. 2. In the embodiment disclosed herein, each of these routines are implemented in the "C" language. However, it should be understood that other suitable computer languages may be employed to implement the method according to the present invention. Accordingly, while the Read_TCE_File routine 102 of FIG. 3A includes the steps of reading TCE information from the edited central database 22 into a "struct", an object-oriented "class" could be used instead for this data structure.

Figure 3A:
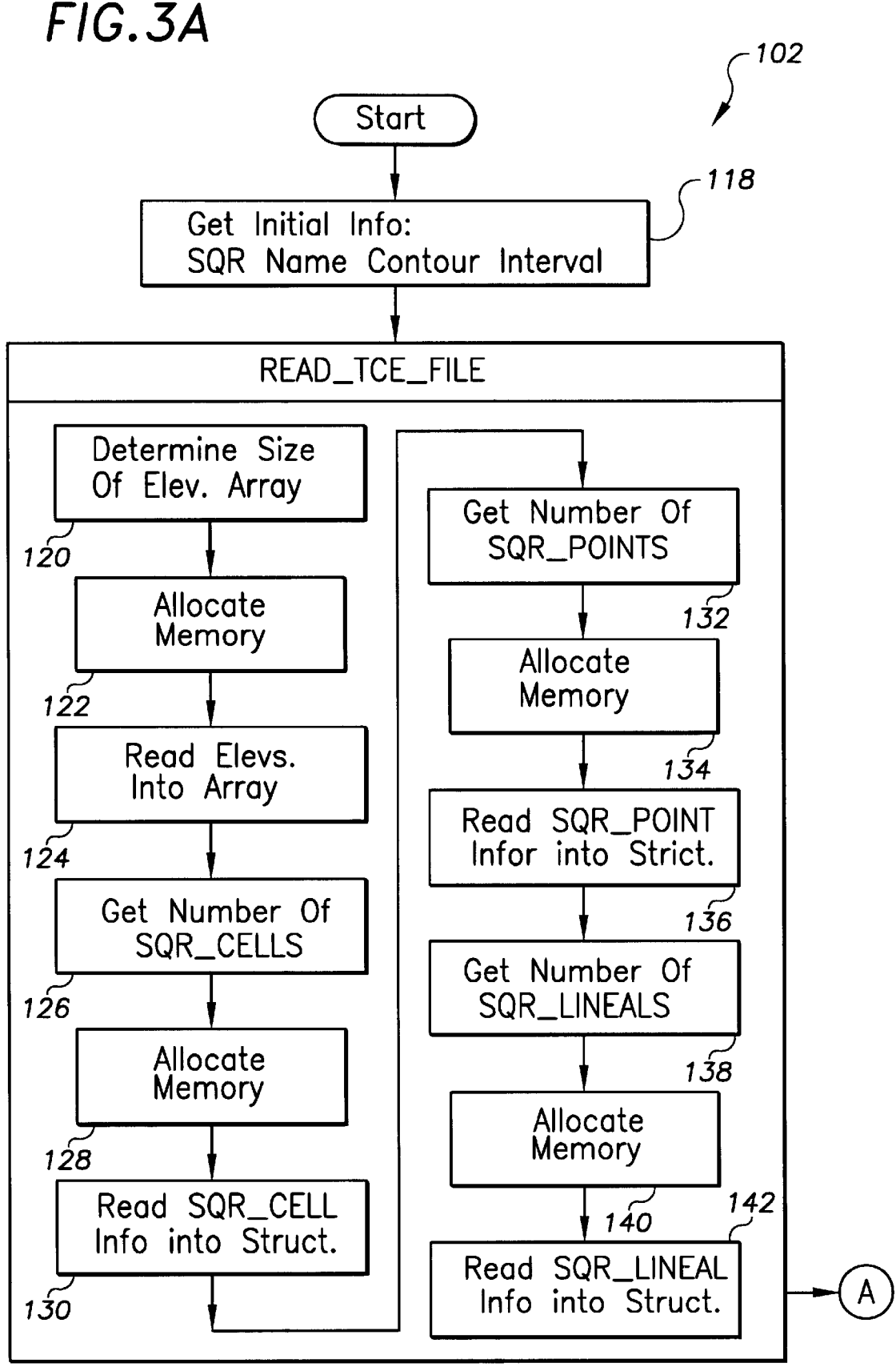

Referring specifically to FIG. 3A, it should be noted that some initial information is needed before the Read_TCE_File routine 102 may be executed. In this regard, block 118 shows that the square name and contour interval will first be obtained from the edited central database 22. From this information, the size of the elevation array may be determined (block 120). Then, once the size of the elevation array is known, the appropriate amount of memory space may be allocated (block 122), and the elevation data read into the array of elevation information in the data structure (block 124). This same procedure will then be followed for the number of square cell information (blocks 126–130), the number or square points information (blocks 132–136), and the number or square lineals (blocks 138–142). In the context of the discussion presented above, it should be understood that the square cells refer to areal features, the square lineals refer to lineal features and the square points refer to point features.

More specifically, the determination of the contour interval (block 118) may be made from the following constants, which are provided at the beginning of the TCE file: "Sqr_Spaces" and "Sqr_Size". For example, with "Sqr_Spaces 32", it will be known that the elevation data is grouped into a 32×32 array. Similarly, with "Sqr_Size 16000", it will be known that this TCE file contains terrain and cultural data for an area that is 16000 meters square. The TCE file may also contain other constants, such as the latitude and longitude of the four corners of the square (e.g., "SW_LL" for the southwest corner latitude and longitude).

After this initial information, the TCE file will preferably contain separate sections for the elevation data, the cell polygonalization data, the point data, and the lineal data. The TCE file may also contain terrain polygon data which could be used to smooth the edges of the polygons to be plotted on the chart. In one embodiment according to the present invention, the elevation data is read as a two dimensional area (e.g., 32×32). For example, a small portion of the elevation array may be represented as follows:

| 1500 | 900 | 750 | 1200 | 1650 |
| 1200 | 1200 | 900 | 900 | 1500 |

By dividing the Sqr_Size by Sqr_Spaces, the spacing between each elevation in both the x and y directions may be determined. In the case presented above, the spacing would be 16000/32=500. In other words, each elevation in the array will be 500 meters from the adjacent elevation. Thus, if the example data given above represents the upper left corner of the array, then in x,y,z coordinates, the first number may be characterized as 0,0,1500. Similarly, the next elevation on the same line may be characterized as 500,0,900. Additionally, the first elevation on the next line may be characterized as 0,500,1200. Thus, it should be appreciated that the x and y positions in this array may be found by multiplying the row and column positions by 500.

The polygonalization data in the TCE file may also take the following form:

| Sqr_Cells 1000 | | | | | | |
| AAAAA | 0 | 0 | 1 | 2 | DRTS | DRTS; |
| AAAAB | 0 | 1 | 1 | 2 | DRTG | DRTS; |
| AAABA | 0 | 3 | 1 | 3 | DRTS | DRTG; |

The "Sqr_Cells" designation indicates the beginning of the polygonalization data, and the "1000" designation means that array data is divided 1000 cells in this example. In this regard, the array is divided into polygons that are coplanar (on the same plane in space). In other words, within the polygon, the slope from one side to the other will be constant. For example, there will not be a hill in the middle of the polygon. However, two polygons adjacent to each other could form a hill or a valley. In this database structure, all of the cells are square and contain four elevations, one at each corner. Then, this square, or cell, may be divided into two right triangles, if needed to keep it coplanar. Thus, either the square itself or its division into two triangles is the polygon which will be plotted.

The first field in the array (e.g., AAAAA) is the cell name. The next two fields (e.g., 0 0) are the cell's lower left corner elevation in the elevation array described above. The next field (e.g., 1) indicates how many elevations square it is. In other words, if this field were "2", then the cell would be 1000 meters on a side instead of 500 meters. The next field (e.g., 2) indicates what type of polygon it is. In this regard, a "2" means that the square cell is divided into two triangles from the upper right of the cell to the lower left of the cell, and these two triangles are the polygons. A "3" in this field means that the entire square cell is the polygon, and a "1" means that the square cell is divided into two triangles from the upper left to the lower right. The remaining two fields (e.g., DRTS DRTS) indicate the terrain type for each of the two possible polygons. For example, DRTS means that the terrain is dirt.

With respect to the point data, the TCE file may use the following form:

Sqr_Point

18

CITB2 8503.155273 14354,606445 10 0 0 0;

BUCHUR 13621.451172 8659.267578 10 10 0 0;

The "Sqr_Point" designation indicates the beginning of cultural point features, or features that can be located by a single point. For example, a radio tower only needs one set of x and y coordinates to describe its location. The number "18" indicates how many point features are contained in this TCE file, and in this case the next 18 would describe each point feature. The first field (e.g., CITB2) is the feature name and type. In this case, the feature is a small city that would only appear as a dot on a chart of this size. The next two fields provide the x and y coordinates in the 16000 meter area. The remaining fields represent additional information contained in the TCE file that is not relevant to the creation of the database correlatable chart. Accordingly, it should be appreciated that the process of reading the TCE file into a data struct (as described above) will preferably filter out such extraneous information. While the data struct will preferably follow the organization of the TCE file, it should be appreciated that other suitable data structures may be employed in the appropriate application.

With respect to the lineal data, the TCE file may use the following structure:

Sqr_Lineals
2
IHW 14
12509.000000 16000.000000 8 0
11652.387695 15420.972656 8 0

These lineal features comprise features that may be described like a line, such as a road, railroad track or a river. The number under Sqr_Lineals (e.g., 2) identifies how many lineals are in this TCE file. The next line (e.g., IHW 14) indicates that the first of lineal feature is an interstate highway and that "14" points are connected end to end draw the highway. Accordingly, the next 14 lines in the TCE file will describe the x and y coordinates for each of these points. As with other sections in the TCE file, the remaining fields are not relevant, and are not stored in the data struct.

As discussed above, the TCE file may also contain information which may be used to smooth out the edges of the polygons to be plotted. More specifically, these are polygons that are placed along the edges of the Sqr_Cells polygons to make the terrain look less blocky. These smoothing or resolution enhancement polygons are much smaller than the Sqr_Cells polygons, and they may be described in the TCE file as follows:

Sqr_polygons
5
CRA 3
8500.000000 13500.000000 −9999.000000
9000.000000 14000.000000 −9999.000000

In this regard, the number "5" indicates how many Sqr_Polygons are contained in the TCE file. The next line identifies the terrain type of the polygon (e.g., city residential). The numeral "3" identifies how many points or vertices are used to represent this polygon. The next line contains the x and y coordinates for the first of these three points. Additionally, the z elevation may also be contained in the TCE. However, if the elevation is not known at this point, then "−9999.000000" will be used as a default. In such a case, the elevation array will have to be referred to in order to determine the elevation at this point.

Turning now to FIG. 3B, a flow chart of the Plot_Sqr_Cell routine 104 is shown. In this regard, the polygon coordinates will be computed from the Sqr_Cells array (block 144), and these coordinates will be converted to the scale of the plotter (block 146). Then, the polygon color will be obtained from a look up table and the terrain type indicated in the Sqr_Cells array (block 148), and each of the polygons will be drawn in this color by the plotter (block 150). While the polygons are plotted first in this embodiment, it should be appreciated that other suitable plotting orders may be employed.

Figure 3C:
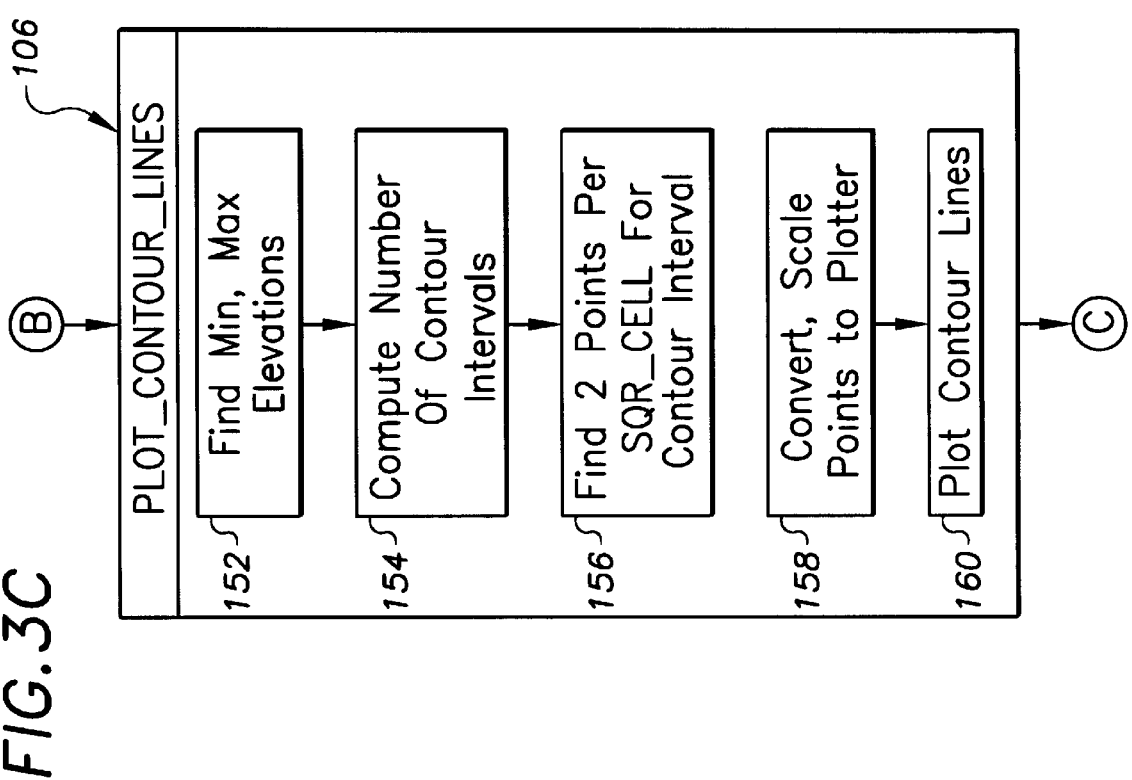
Figure 3B:
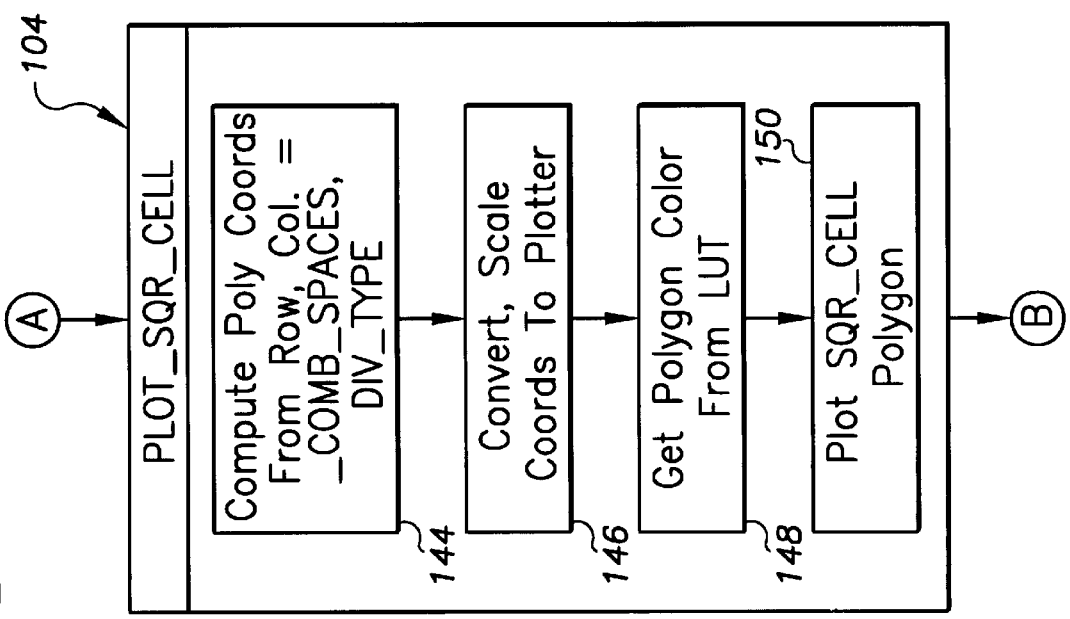

FIG. 3C illustrates the flow chart for the Plot_Contour_Lines routine 106. While a more specific set of flow charts for this routine will be described in connection with FIGS. 4A–4C, the following may be noted at this point. At least the maximum or minimum elevation of the Sqr_Elevations array (e.g., 32×32) will be determined (block 152), and the number of contour intervals will be computed (block 154). Then, two points per Sqr_Cell will be found for each contour interval (block 156), so that the contour lines may be drawn. Thereafter, these coordinates will be converted to the scale of the plotter (block 158) and the contour lines will be drawn (block 160).

Figure 3D:
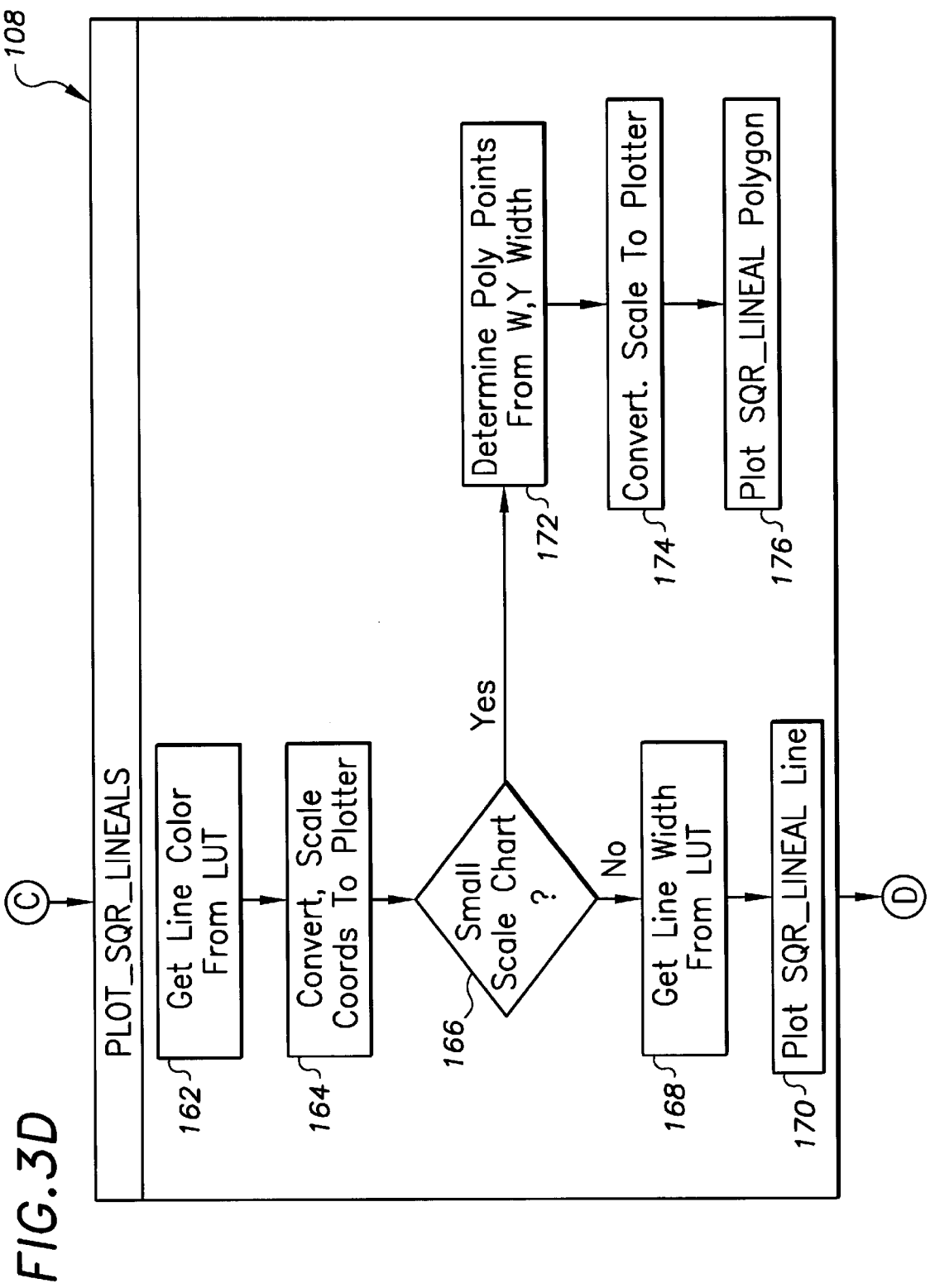

FIG. 3D illustrates the flow chart for the Plot_Sqr_Lineals routine 108. In this regard, the line color for the specific lineal type will be obtained from a look up table (block 162), and the coordinates of the end to end points will be converted to plotters units (block 164). Then, if a small scale chart is to be created (diamond 166), then the line width will be obtained from a look up table (block 168), and the lineal features plotted (block 170). Otherwise, the width of each lineal feature will need to be obtained from the Sqr_Lineals array (block 172), and the polygonal coordinates converted (block 174) before plotting (block 176).

Figure 3E:
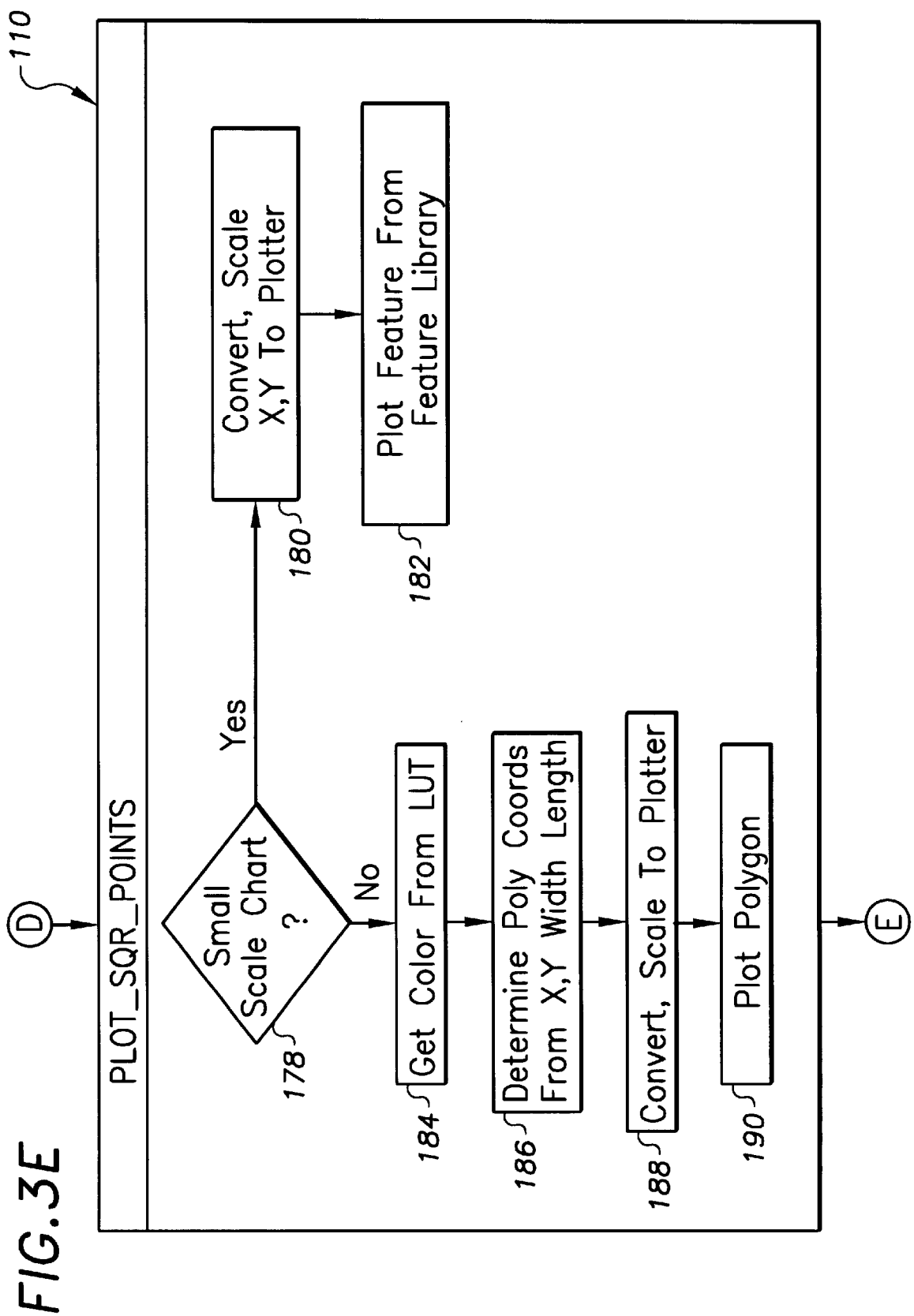

FIG. 3E illustrates the flow chart for the Plot_Sqr_Points routine 110. An initial determination is made as to whether the chart scale will be small or large (diamond 178). If the scale is relatively small, then the x and y coordinates for each point feature will be converted to plotter units (block 180), and the features will be plotted from a feature library which describes the icon for each feature type (block 182). Otherwise, the appropriate color of the feature type will be obtained from a look up table (block 184), and the polygonal coordinates for the features will be obtained from the data structure which defines the Sqr_Points array (block 186). Then, these coordinates will be converted to plotter units (block 188), and the point features will be plotted (block 190).

FIG. 3F and 3G illustrate the flow charts for the Plot_Text routine 112, the Plot_Grid routine 114 and the Plot_Legend routine 116. In this regard, the information necessary to plot this information may be obtained directly from the TCE file. Thus, in the case of the Plot_Text routine 112, the text will be determined (block 192), and the coordinates of this text determined (block 194). Then, the text coordinates will be converted to plotter units (block 196). Additionally, the orientation and color of the text will be determined (block 198) before this text is plotted (block 200).

Figure 4B:
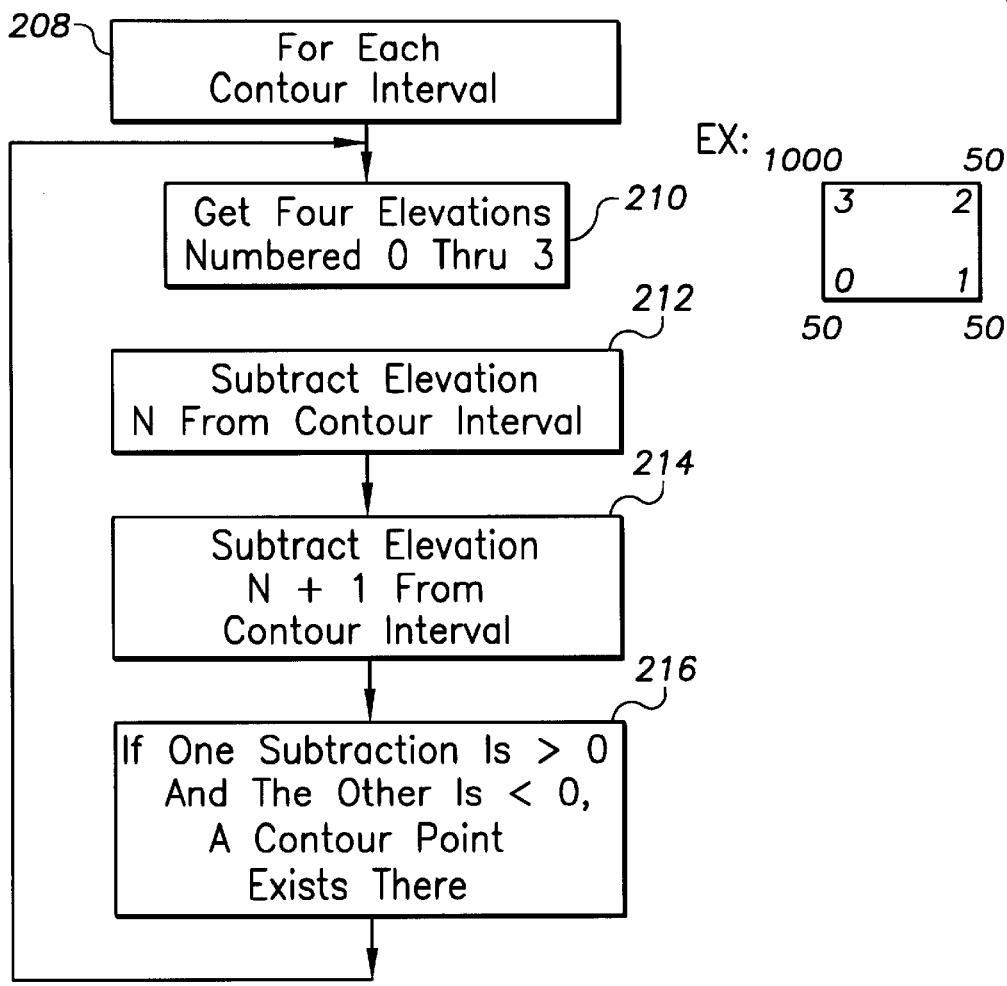
Figure 4C:
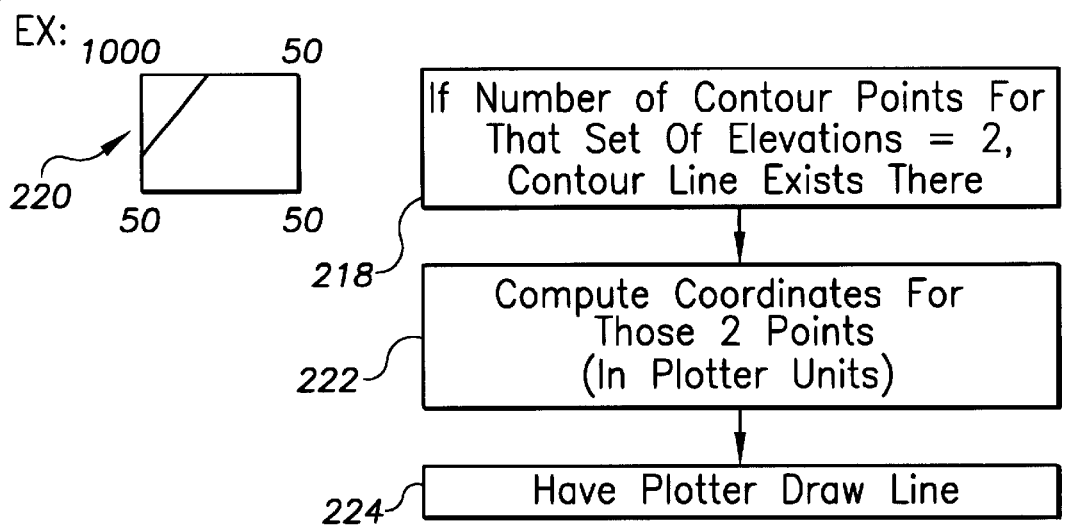

Referring to FIGS. 4A–4C, a set of flow charts is provided to illustrate various functions employed in the Plot_Contour_Lines routine 106. As shown in FIG. 4A, a contour interval constant is obtained from a configuration file (block 202), and a search of the elevation data struct is made to determine the highest elevation in the array (block 204). Then, the number of contour intervals will be determined from these two pieces of information (block 206). For example, if the highest elevation is "2000" feet and the interval constant is "20", then the number or intervals will be 100 (i.e., 2000/20). In other words, a contour line should be drawn for every 100 foot change in elevation.

Next FIG. 4B shows a nested-loop sub-routine which is executed for each contour interval, as indicated by block 208. In the first place, the elevation level at the four corners of each the Sqr_Cells is obtained, and they are numbers "0" through "3" (block 210), as shown in FIG. 4B. Then, blocks 212 and 214 illustrate two substraction steps, and block 216 illustrates a resulting comparison step. For example, with a contour interval of every 100 feet in elevation, and with N=2, then step 212 would be "50–100", and step 216 would be "1000–100). Accordingly, the result of step 212 would be "−50" and the result of step 214 would be "+900". Thus, one of these substraction operations would be greater than zero, and the other would be less than zero under step 216. As a result, it will be determined that a contour point exists between the corners designated as "2" and "3". This procedure will be repeated by indexing up the contour interval from an elevation of 100, to an elevation of 200 for the next loop, and an elevation of 300 for the succeeding loop, until the maximum elevation of 1000 is reached. Each of these contour points will then be located proportionally between the corners of the Sqr_Cell in question.

Then, as shown in FIG. 4C, a determination will be made if the number of contour points for each set of elevations equals two (block 218). Thus, as shown in the Sqr_Cell 220 of FIG. 4C, a set of two 100 foot elevation contour points exist, so a contour line will be drawn to connect these two points. However, the coordinates of these contour points must first be converted to plotter units (block 222) before the contour lines are drawn (block 224).

Figure 5:
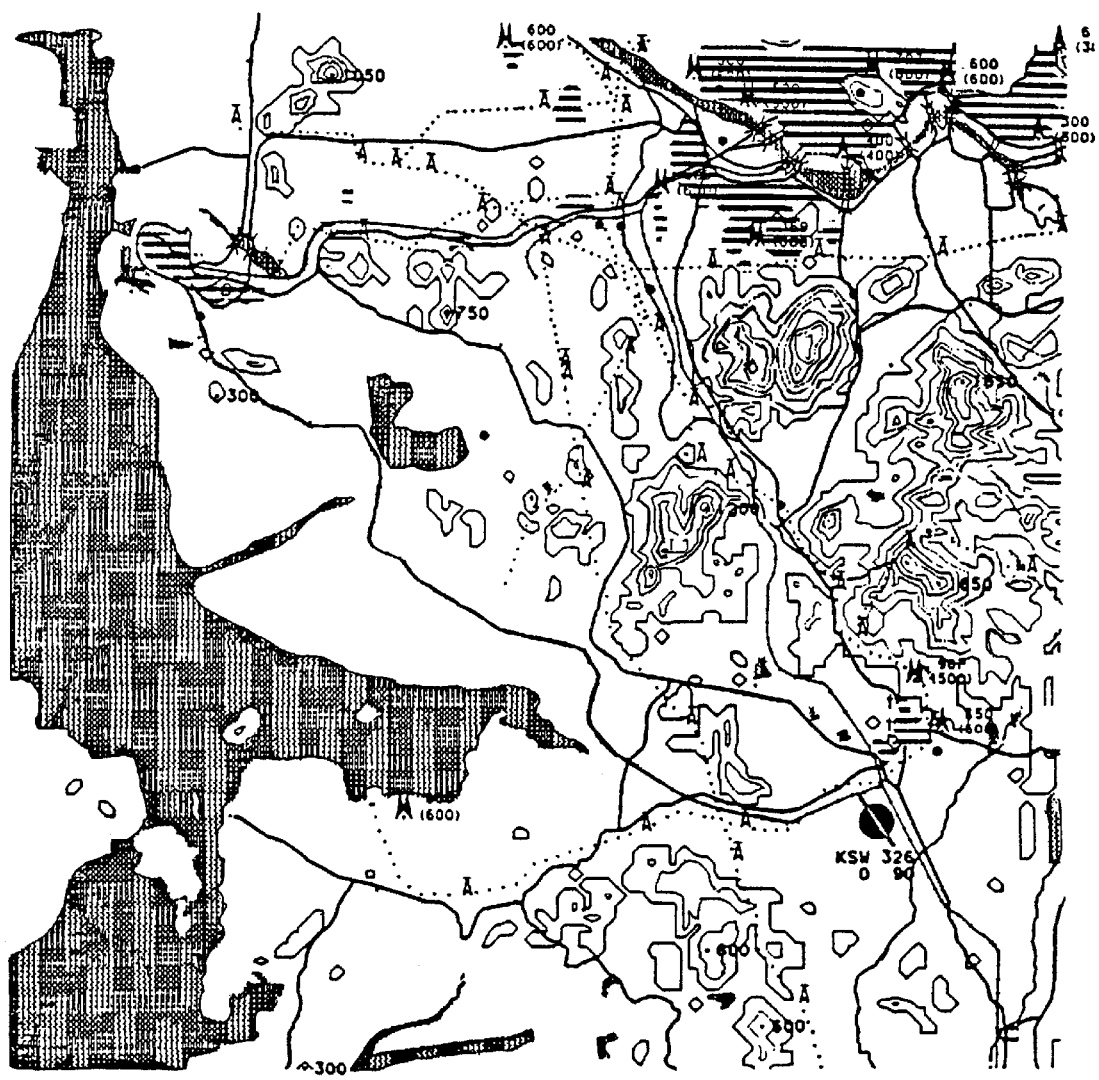
FIG. 5 is an illustration of a database correlatable chart in accordance with the present invention.

Referring briefly to FIG. 5, a database correlatable chart in accordance with the present invention is shown. This database correlatable chart is simply illustrated as an example of a typical chart (in black and white) which contains a variety of terrain and cultural information.

While the above detailed description sets forth the preferred embodiments of the present invention, it will be understood that the present invention is susceptible to modification, variation and change without departing from the scope and fair meaning of the subjoined claims.

What is claimed is:

1. A method of creating a hard copy database correlatable navigational chart from a non-real-world visual database stored as a computer file array which defines the terrain and cultural features of a simulated non-real-world environment, comprising the steps of:

reading said non-real-world visual database into a filtered data structure which includes coplanar polygonal areas, lineal routes, and point types to represent at least one block of terrain in said simulated non-real-world environment;

determining a number of contour intervals for said block of terrain in said simulated non-real-world environment;

testing said block of terrain for combinations of elevation levels to determine the need for and location of any contour lines;

determining shape coordinates for each of said point types;

converting planar locations of said coplanar polygonal areas, said contour lines, said lineal routes and said shape coordinates of said point types to a pre-selected scale; and generating a hard copy of a navigational chart which is correlated to said non-real-world visual database by plotting each of said coplanar polygonal areas, said contour lines, said lineal routes, and said shape coordinates for each of said point types in accordance with said pre-selected scale.

2. The method according to claim 1, wherein said step of plotting each of said coplanar polygonal areas includes the step of filling the area within the outlines of said coplanar polygonal areas with a color which is indicative of a type of areal feature represented by each respective polygonal area.

3. The method according to claim 1, which further comprises selecting an icon shape from a library of icon shapes, and plotting the selected icon shape at a location defined by at least one of the shape coordinates.

4. The method according to claim 1, wherein said step of determining the shape coordinates for each of said point types includes the step of determining an orientation of said point types relative to a predetermined reference frame.

5. The method according to claim 1, wherein said plotting step includes the steps of plotting said coplanar polygonal areas at a first time, plotting said contour lines at a second time, plotting said lineal routes at a third time, and plotting said shape coordinates of said point types at different time.

6. A method of creating a hard copy database correlatable navigational chart from a non-real-world visual database stored as a computer file array which defines the terrain and cultural features of a simulated non-real-world environment, comprising the steps of:

reading said non-real-world visual database into a filtered data structure which includes coplanar polygonal areas, lineal routes, and point types to represent at least one block of terrain in said simulated non-real-world environment;

converting planar locations of said coplanar polygonal areas into a preselected scale, and creating a portion of the hard copy navigational chart by plotting each of said coplanar polygonal areas in accordance with said pre-selected scale;

determining a number of contour intervals for said block of terrain for said simulated non-real-world environment;

testing said block of terrain for combinations of elevation levels to determine a need for and location of any contour lines;

converting said contour lines into said pre-selected scale, and creating other portions of the hard copy navigational chart by plotting each of said contour lines in accordance with said pre-selected scale;

converting planar locations of said lineal routes into said pre-selected scale, and creating still other portions of the hard copy navigational chart by plotting each of said lineal routes in accordance with said pre-selected scale; and determining shape coordinates for each of said point types, converting said shape coordinates to said pre-selected scale, and plotting each of said shape coordinates in accordance with said pre-selected scale on the hard copy navigational chart.

7. The method according to claim 6, wherein said step of plotting each of said coplanar polygonal areas includes a step of filling an area within the outlines of said polygonal areas with a color which is indicative of the type of areal feature represented by each respective coplanar polygonal area.

8. The method according to claim 6, wherein said step of determining the number of contour intervals for said block of terrain for said simulated environment includes the step of finding the minimum and maximum elevation in said block of terrain.

9. The method according to claim 6, wherein said step of testing said block of terrain for combinations of elevation levels to determine the need for and location of any contour lines includes the step of finding two points in said coplanar polygonal area that each have matching elevations.

10. The method according to claim 9, wherein said step of finding two points in said coplanar polygonal area that each have matching elevations includes the step of converting said points into said pre-selected scale.

11. The method according to claim 6, wherein said step of plotting each of said lineal routes includes a step of filling an area within the outlines of said lineal routes with a color which is indicative of the type of lineal feature represented by each respective lineal route.

12. The method according to claim 6, wherein said step of plotting each of said lineal routes includes a step of selecting one of a library of line widths which is indicative of a type of lineal feature represented by each respective lineal route.

13. The method according to claim 6, wherein said step of determining the shape coordinates for each of said point types includes a step of determining a orientation of said point types relative to a predetermined frame.

14. The method according to claim 6, wherein said step of plotting each of said shape coordinates includes a step of selecting a corresponding icon shape from a library of icon shapes which is indicative of a type of point feature represented by each respective point.

15. The method according to claim 6, wherein said step of plotting each of said shape coordinates includes the step of filling an area within outlines of said shape coordinates with a color which is indicative of a type of point feature represented by each respective point type.

16. The method according to claim 6, wherein said plotting step includes the steps of plotting said coplanar polygonal areas at a first time, plotting said contour lines at a second time, plotting said lineal routes at a third time, and plotting said shape coordinates of said point types at different time.

* * * * *